(12) United States Patent
Nakashima et al.

(10) Patent No.: US 8,860,550 B2
(45) Date of Patent: Oct. 14, 2014

(54) IN-VEHICLE DEVICE CONTROLLER

(75) Inventors: Kazuhiro Nakashima, Anjo (JP); Arinobu Kimura, Toyota (JP); Hiroki Okada, Toyota (JP); Hiroko Murakami, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 401 days.

(21) Appl. No.: 13/280,911

(22) Filed: Oct. 25, 2011

(65) Prior Publication Data

US 2012/0105198 A1 May 3, 2012

(30) Foreign Application Priority Data

Oct. 27, 2010 (JP) ................................. 2010-240952

(51) Int. Cl.
| | |
|---|---|
| *B60R 9/00* | (2006.01) |
| *G08C 19/12* | (2006.01) |
| *B60R 25/24* | (2013.01) |
| *B60R 25/04* | (2013.01) |
| *G07C 9/00* | (2006.01) |

(52) U.S. Cl.
CPC .. *G07C 9/00309* (2013.01); *G07C 2009/00333* (2013.01); *B60R 25/24* (2013.01); *B60R 25/04* (2013.01)
USPC ....... 340/5.72; 340/13.24; 340/5.64; 370/344

(58) Field of Classification Search
CPC ............................. B60R 25/24; G07C 9/00309
See application file for complete search history.

(56) References Cited

U.S. PATENT DOCUMENTS

| | | | |
|---|---|---|---|
| 5,055,701 A * | 10/1991 | Takeuchi ..................... | 307/10.2 |
| 6,549,117 B1 | 4/2003 | Kato et al. | |
| 6,943,725 B2 | 9/2005 | Gila et al. | |

(Continued)

FOREIGN PATENT DOCUMENTS

| | | |
|---|---|---|
| DE | 4421526 | 8/1995 |
| DE | 4429418 | 2/1996 |

(Continued)

OTHER PUBLICATIONS

Search/Examination Report dated Oct. 30, 2012 in corresponding Chinese Application No. 2011-10342687.3 with English translation.

(Continued)

*Primary Examiner* — Travis Hunnings
*Assistant Examiner* — Omeed Alizada
(74) *Attorney, Agent, or Firm* — Harness, Dickey & Pierce, PLC

(57) ABSTRACT

An in-vehicle device controller includes: an in-vehicle unit for controlling an in-vehicle device; and a portable device. The in-vehicle unit includes a request signal transmitter for transmitting a request signal including random information to the portable device. The portable device transmits a response signal in response to the request signal at multiple frequencies according to a switching pattern corresponding to a part of the random information. The in-vehicle unit further includes: a frequency specifying device for specifying the switching pattern based on the part of the random information; and a reception determination device for executing a reception determination process of the response signal based on a specified switching pattern. The in-vehicle device identifies the portable device according to the reception determination process, and controls the in-vehicle device according to an identification of the portable device.

16 Claims, 7 Drawing Sheets

(56) References Cited

U.S. PATENT DOCUMENTS

| | | |
|---|---|---|
| 2003/0117259 A1 | 6/2003 | Haas et al. |
| 2003/0129952 A1* | 7/2003 | Inoue .......................... 455/95 |
| 2003/0156068 A1 | 8/2003 | Hoetzel |
| 2005/0159106 A1* | 7/2005 | Palin et al. ................. 455/41.2 |
| 2010/0013596 A1* | 1/2010 | Kakiwaki .................... 340/5.64 |

FOREIGN PATENT DOCUMENTS

| | | |
|---|---|---|
| DE | 10019750 | 12/2001 |
| DE | 10223219 | 12/2003 |
| DE | 10304081 | 5/2004 |
| EP | 1304660 | 4/2003 |
| JP | 10-093533 | 4/1998 |
| JP | 2000-104429 | 4/2000 |
| JP | 2003-138817 | 5/2003 |
| JP | 2005-299305 | 10/2005 |
| JP | 2005-318232 | 11/2005 |
| JP | 2007-191945 | 8/2007 |
| JP | 2008-240315 | 10/2008 |
| JP | 2009-235867 | 10/2009 |

OTHER PUBLICATIONS

Office Action dated Jul. 3, 2012 in corresponding German Application No. 10-2011-054787.8 with English translation.
Office action dated Sep. 17, 2013 in corresponding JP Application No. 2010-240952.
U.S. Appl. No. 13/145,838, filed Jul. 22, 2011, Nakashima et al.
U.S. Appl. No. 13/145,837, filed Jul. 22, 2011, Nakashima et al.

* cited by examiner

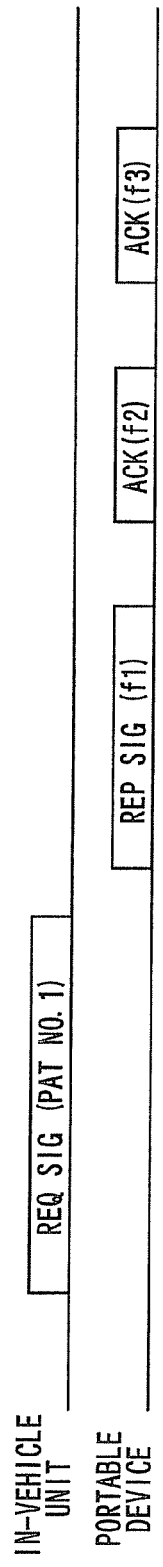
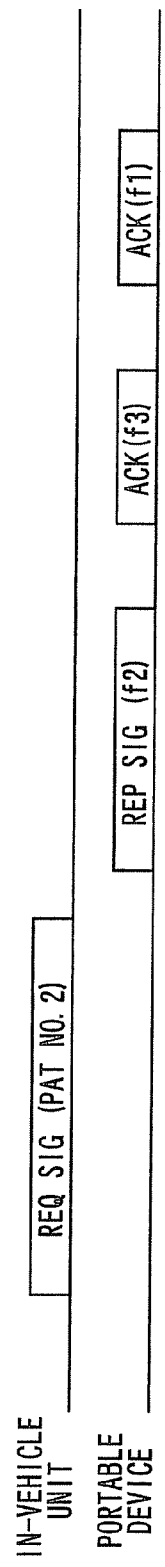

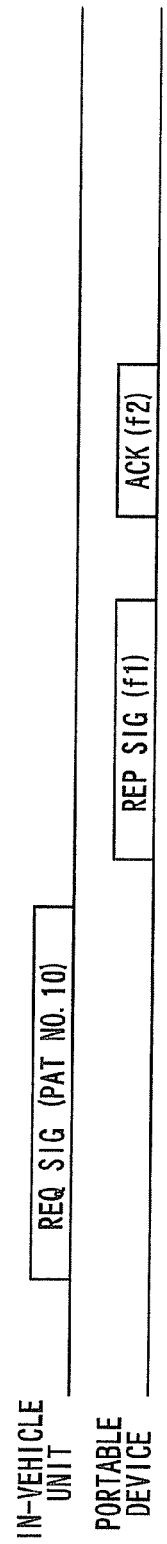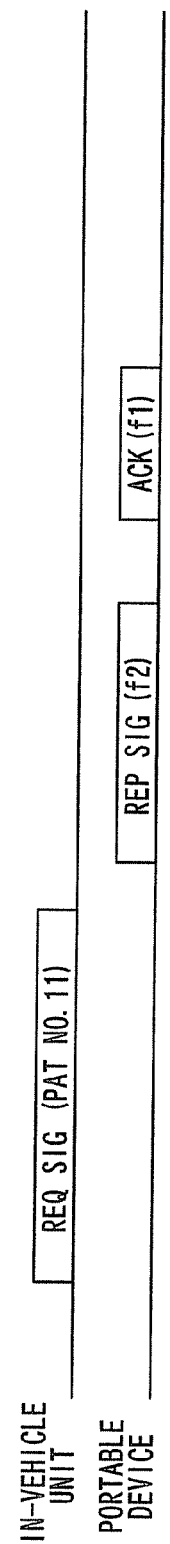

IN-VEHICLE DEVICE CONTROLLER

CROSS REFERENCE TO RELATED APPLICATION

This application is based on Japanese Patent Application No. 2010-240952 filed on Oct. 27, 2010, the disclosure of which is incorporated herein by reference.

TECHNICAL FIELD

The present invention relates to an in-vehicle device controller for controlling an in-vehicle device according to a response signal from a portable device.

BACKGROUND

Conventionally, a remote controller for unlocking and locking a door of a vehicle without operating a key of the vehicle is well known in, for example, JP-A-2000-104429. The remote controller transmits a request signal to a portable device, and receives a response signal from the portable device in accordance with the request signal so that the remote controller verifies the portable device based on the response signal. When the remote controller determines that the portable device is a proper key of the vehicle, and a door of the vehicle is locked, the remote controller unlocks the door.

In an in-vehicle device controller for transmitting a request signal to the portable device, receiving the response signal from the portable device in accordance with the request signal, and checking the portable device based on the response signal, a precondition should be satisfied for checking the portable device such that an user with the portable device is disposed in a detection area of the in-vehicle device controller on a vehicle side.

However, in a conventional in-vehicle device controller, a transmitting frequency of the response signal from the portable device is fixed. If the response signal is copied, the in-vehicle device controller may determine that the portable device is proper even when the user with the portable device is not disposed in the detection area of the in-vehicle device controller on the vehicle side.

Thus, it is considered that the portable device switches and transmits the response signal having different frequencies in response to the request signal in order to prevent a copy of the response signal.

However, when a switching pattern of the frequencies of the response signal is fixed, the third person may easily specify the switching pattern. When the third person specifies the switching pattern, the third person can copy the response signal by tuning a reception frequency according to the switching pattern. Thus, security of the remote controller is reduced.

Further, it is considered that the security of the remote controller is improved by increasing the number of transmitting times of the response signal with switching the frequency of the response signal. As the transmitting times of the response signal increases, a checking time for checking the response signal becomes longer. Thus, responsiveness of the remote controller is reduced.

SUMMARY

In view of the above-described problem, it is an object of the present disclosure to provide an in-vehicle device controller for controlling an in-vehicle device according to a response signal from a portable device. The responsiveness of the in-vehicle device controller and the security of the in-vehicle device controller are improved.

According to an example aspect of the present disclosure, an in-vehicle device controller includes: an in-vehicle unit mounted on a vehicle for controlling an in-vehicle device; and a portable device. The in-vehicle unit includes a request signal transmitter for transmitting a request signal including random information to the portable device. The portable device transmits a response signal in response to the request signal in such a manner that the response signal is transmitted at a plurality of frequencies, which are switched according to a switching pattern corresponding to a part of the random information in the request signal. The in-vehicle unit further includes a frequency specifying device for specifying the switching pattern based on the part of the random information in the request signal. The in-vehicle unit further includes a reception determination device for executing a reception determination process of the response signal based on a specified switching pattern. The in-vehicle device identifies the portable device according to the reception determination process. The in-vehicle unit controls the in-vehicle device according to an identification of the portable device.

In the above controller, since the switching pattern is specified according to the part of the random information in the request signal, and the in-vehicle unit executes the reception determination process of the response signal from the portable device with using the specified switching pattern, it is difficult to find the switching pattern for a third person. Thus, the responsibility of the controller is not reduced, and the security if he controller is improved.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B are diagrams showing a response signal corresponding to a request signal;

FIGS. 3A and 3B are diagrams showing another response signal corresponding to a request signal;

DETAILED DESCRIPTION

First Embodiment

Figure 1:
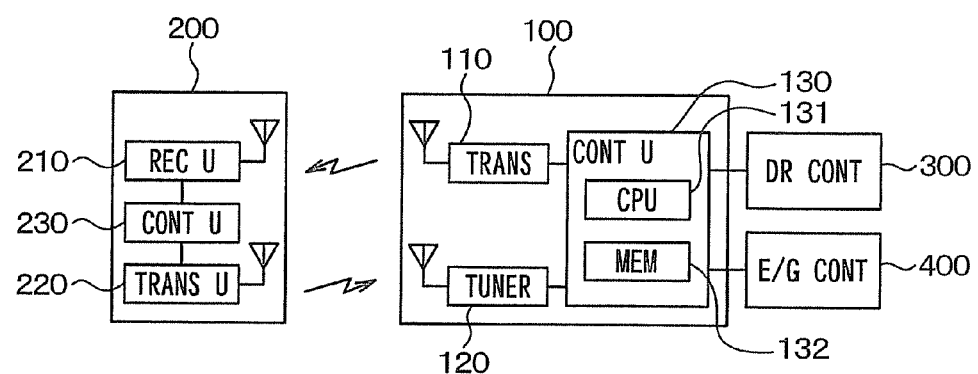
FIG. 1 is an in-vehicle device controller according to a first embodiment.

An in-vehicle device controller according to a first embodiment is shown in FIG. 1. The in-vehicle device controller includes an in-vehicle unit 100 and a portable device 200. The in-vehicle device controller performs a reception determination process of a response signal transmitted from the portable device 200 in response to a request signal from the in-vehicle unit 100 mounted on the vehicle so that the in-vehicle device controller checks the portable device 200. Based on the check result, the in-vehicle device controller controls an in-vehicle device such as a door controller 300 and an engine controller 400.

The portable device 200 transmits multiple response signals by switching frequencies of the response signals. The in-vehicle device controller transmits the request signal including random information in order to increase a secrecy level i.e., security of the response signal transmitted from the portable device 200. The switching pattern of frequencies in the response signals is specified based on the information, which is provided by a part of the request signal. The in-vehicle device controller performs the reception determination process of the response signal with using the switching pattern of the frequencies according to the information in the request signal.

The in-vehicle device controller performs verification in order to lock a door of the vehicle according to a pushing operation (i.e., locking operation) of a door switch by a user, the door switch being arranged on a door handle. When the verification is confirmed, the in-vehicle device controller unlocks the door of the vehicle. Further, the in-vehicle device controller performs the verification for unlocking the door when the user grips the door handle so as to touch a touch sensor, which is arranged on a rear side of the door handle. When the verification is confirmed, the in-vehicle device controller unlocks the door of the vehicle.

When the user pushes an engine start/stop switch with pressing a brake pedal, i.e., when the user performs an engine start operation, the in-vehicle device controller performs verification in order to start the engine of the vehicle. When the verification is confirmed, the in-vehicle device controller starts the engine of the vehicle. When the user pushes the engine start/stop switch under a condition that the vehicle stops running, i.e., when the user performs an engine stop operation, the in-vehicle device controller performs verification in order to stop the engine of the vehicle. When the verification is confirmed, the in-vehicle device controller stops the engine of the vehicle.

The in-vehicle unit 100 includes a transmitter 110, a tuner 120 and a control unit 130.

The transmitter 110 transmits a request signal wirelessly toward a predetermined detection area on the outside of the vehicle according to data input from the control unit 130. The transmitter 110 modulates an electric wave by a FM method or a AM method, and transmits a modulated electric wave as a wireless signal. The electric wave has an electric wave in a low frequency band (LF band) as a carrier wave. The electric wave has a frequency, for example, around 134 KHz.

The transmitter 110 includes an outside antenna disposed on an outside of a compartment of the vehicle and an inside antenna disposed in the compartment.

The in-vehicle unit 100 performs an outside verification and an inside verification independently. Specifically, in the outside verification, the in-vehicle unit 100 transmits the request signal via the outside antenna so that the in-vehicle unit 100 verifies the portable device 200 disposed on the outside of the compartment. In the inside verification, the in-vehicle unit 100 transmits the request signal via the inside antenna so that the in-vehicle unit 100 verifies the portable device 200 disposed in the compartment.

The tuner 120 receives the response signal, which is output wirelessly from the portable device 200 in response to the request signal from the transmitter 110. The tuner 120 transmits data in the response signal to the control unit 230. The tuner 130 receives an electric wave in a ultra-high frequency band (i.e., UHF band).

The in-vehicle unit 100 tunes a reception frequency and receives the response signal when the tuner 130 receives the response signal, which is successively transmitted from the portable device 200.

The control unit 130 includes a CPU 131, a memory 132 and the like. The CPU 31 executes various processes according to a program stored in the memory 132.

The control unit 130 is connected to the door controller 300 and the engine controller 400.

The door controller 300 includes an actuator for controlling the door to lock and unlock, a door switch arranged on a door handle, a touch sensor arranged on a rear side of the door handle and a control unit (not shown).

The door controller 300 transmits a signal corresponding to a pushing operation of the door switch on the door handle by the user and a signal corresponding to the touch operation of the touch sensor arranged on the rear side of the door handle to the in-vehicle unit 100, respectively. When the lock instruction signal of the door is input into the door controller 300 from the in-vehicle unit 100, the door controller 300 controls the actuator to lock the door. When the unlock instruction signal of the door is input into the door controller 300 from the in-vehicle unit 100, the door controller 300 controls the actuator to unlock the door.

The engine controller 400 includes the engine start/stop switch for instructing an engine start operation and an engine stop operation and a control unit. When the driver operates the engine start/stop switch, the engine controller 400 transmits a signal corresponding to the engine start/stop switch operation to the in-vehicle unit 100. Further, when the engine start instruction from the in-vehicle unit 100 is input into the engine controller 400, the engine controller 400 starts the engine. Further, when the engine controller 400 determines based on the vehicle speed signal that the vehicle stops running, and further, the engine controller 400 determines that the user operates the engine start/stop switch, the engine controller 400 stops the engine.

The portable device 200 includes a control unit 230, a reception unit 210 for receiving the request signal from the in-vehicle unit 100 and for transmitting data in the request signal to the control unit 230, and a transmission unit 220 for wirelessly transmitting the response signal including the data input from the control unit 230.

The transmission unit 220 transmits a wireless signal, which is prepared by frequency modulating or amplitude modulating the electric wave as a carrier wave when the transmission unit 220 transmits the response signal. The electric wave has a frequency, which is selected among multiple frequencies. In the present embodiment, the transmission unit 220 selects the frequency among multiple frequencies, which are defined as f1, f2, . . . and fn. The multiple frequencies are disposed between 300 MHz and 400 MHZ in the UHF band.

The in-vehicle unit 100 transmits the request signal including random information, and specifies the switching pattern of multiple frequencies of the response signals, which are transmitted from the portable device 200, according to the information in the request signal. When the portable device 200 receives the request signal from the in-vehicle unit 100, the portable device 200 switches the response signal according to the switching pattern of the frequencies, which is prepared based on the information in the request signal.

For example, as shown in FIG. 2A, when the switching pattern of the frequencies is defined as a switching pattern No. 1, which is specified according to the request signal, the portable device 200 transmits the ACK signal with the frequency f2 after transmitting the reply signal with the frequency f1, and then, transmits the ACK signal with the frequency f3 again. Here, the response signal includes the ACK signal and the reply signal. As shown in FIG. 2B, when the switching pattern of the frequencies is defined as a switching pattern No. 2, which is specified according to the request signal, the portable device 200 transmits the ACK signal with the frequency f3 after transmitting the reply signal with the frequency f2, and then, transmits the ACK signal with the frequency f1 again.

As shown in FIG. 3A, when the switching pattern of the frequencies is defined as a switching pattern No. 10, which is specified according to the request signal, the portable device 200 transmits the ACK signal with the frequency f2 after transmitting the reply signal with the frequency f1.

As shown in FIG. 3B, when the switching pattern of the frequencies is defined as a switching pattern No. 11, which is specified according to the request signal, the portable device 200 transmits the ACK signal with the frequency f1 after transmitting the reply signal with the frequency f2.

Thus, the portable device 200 specifies the switching pattern of the frequencies and the number of transmission based on the received request signal. Further, the portable device 200 switches and transmits multiple response signals having different frequencies according to the specified switching pattern.

The memory 132 of the control unit 130 in the in-vehicle unit 100 preliminary stores the ID code of the portable device 200, which the user brings.

When the in-vehicle unit 100 controls the tuner 130 to receive multiple response signals, which are transmitted from the portable device 200, the in-vehicle unit 100 tunes a reception frequency so as to receive the response signal. Further, the in-vehicle unit 100 the ID code in the response signal with the ID code stored in the memory 132 of the control unit 130. The in-vehicle unit 100 checks the portable device 200 by performing the reception determination process of the response signal.

Figure 4:
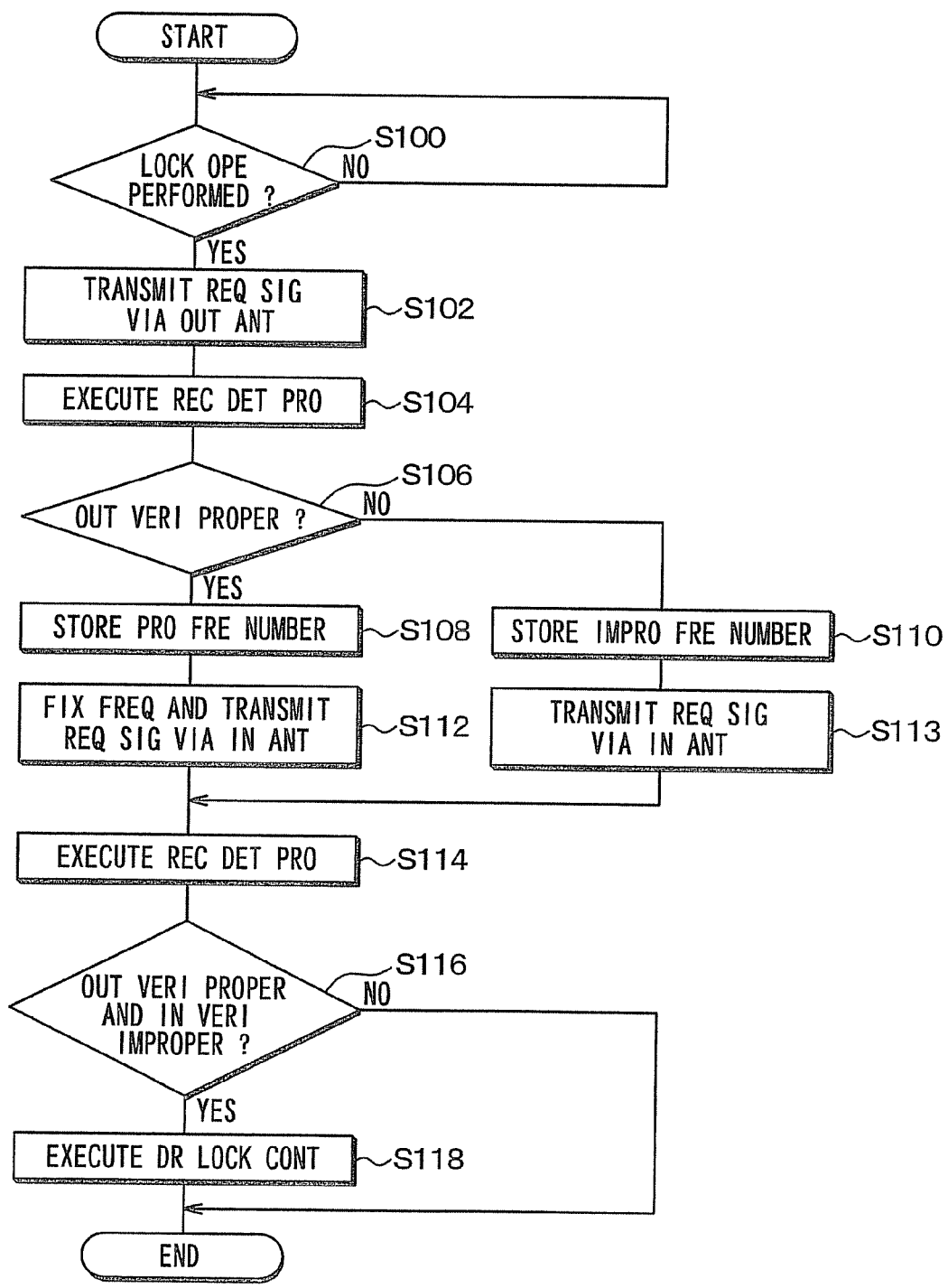
FIG. 4 is a diagram showing a flowchart of a locking process executed by a control unit disposed on a vehicle when a user performs a locking operation of a door of the vehicle.

FIG. 4 shows a flowchart of a locking process executed by the control unit 130 in the in-vehicle unit 100 when the user performs a locking operation of a door of the vehicle. Here, the in-vehicle device controller executes the outside verification and the inside verification according to one locking operation. The control unit 130 periodically executes the locking process in FIG. 4.

First, in step S100, the control unit 130 determines whether the user performs the locking operation of the door. Specifically, the control unit 130 determines whether the pushing operation of the door switch arranged on the door handle is performed.

When the pushing operation of the door switch arranged on the door handle is not performed, the determination in step S100 is "NO." Then, it returns to step S100. When the user performs the pushing operation of the door switch arranged on the door handle, the determination in step S100 is "YES." Then, it goes to step S102. In step S102, the control unit 130 controls the outside antenna to transmit the request signal including the random information. Multiple bits such as three bits for the information showing the switching pattern of the frequencies of the response signal are assigned in the request signal. The switching pattern is randomly specified by associating a part of the request signal with multiple bits.

For example, when the three bits are "000," the switching pattern is specified as the pattern No. 1 in FIG. 2A. When the three bits are "001," the switching pattern is specified as the pattern No. 2 in FIG. 2B. When the three bits are "101," the switching pattern is specified as the pattern No. 10 in FIG. 3A. When the three bits are "100," the switching pattern is specified as the pattern No. 11 in FIG. 3B.

Next, in step S104, the control unit 130 executes the reception determination process of the response signal. Specifically, the control unit 130 specifies the switching pattern of the frequencies in the response signal transmitted from the portable device 200 according to the part of the information in the request signal. The control unit 130 performs the reception determination process of the response signal transmitted from the portable device 200 according to the specified switching pattern. More specifically, the control unit 130 receives the response signal by tuning the reception frequency with the switching pattern. Further, the control unit 130 performs the identification process for identifying the ID code in the reply signal of the response signal with the ID code stored in the memory 132 of the control unit 130.

Next, in step S106, the control unit 130 determines based on the result of the reception determination process of the response signal whether the outside verification is satisfied.

When the reception determination process of the response signal is proper, the determination of step S106 is "YES." Then, in step S108, the control unit 130 controls the memory 132 to store and accumulate the number of frequencies, which are determined as proper reception. The control unit 130 fixes the frequency of the response signal from the portable device 200 to one of the frequencies, which are received as proper reception determined in the outside verification step in step S102. Further, the control unit 130 controls the inside antenna to transmit the request signal in step S112. Then, it goes to step S114.

When the reception determination process of the response signal is improper, the determination of step S106 is "NO." Then, in step S110, the control unit 130 controls the memory 132 to store and accumulate the number of frequencies, which are determined as improper reception. The control unit 130 controls the inside antenna to transmit the random request signal in step S113. Then, it goes to step S114.

In step S114, the control unit 130 executes the reception determination process of the response signal. Specifically, the control unit 130 specifies the switching pattern of the frequencies in the response signal transmitted from the portable device 200 according to the part of the information in the request signal. The control unit 130 performs the reception determination process of the response signal transmitted from the portable device 200 according to the specified switching pattern. More specifically, the control unit 130 receives the response signal by tuning the reception frequency with the switching pattern. Further, the control unit 130 performs the identification process for identifying the ID code in the reply signal of the response signal with the ID code stored in the memory 132 of the control unit 130. Here, in the pattern No. 1 of FIG. 2A, the reception frequency is tuned in the order from f1 to f3 via f2 so as to receive the response signal. In the pattern No. 2 of FIG. 2B, the reception frequency is tuned in the order from f2 to f1 via f3 so as to receive the response signal.

Next, in step S116, the control unit 130 determines based on the reception determination result of the response signal whether the outside verification is proper, and further, the inside verification is improper.

When the outside verification is proper, and further, the inside verification is improper, the determination of step S116 is "YES." Then, in step S118, the control unit 130 executes the door lock control. Specifically, the control unit 130 inputs a door lock instruction signal to the door controller 300. Then, the process in FIG. 4 ends. Thus, the door of the vehicle is locked.

When the control unit 130 determines in step S106 that the outside verification is improper, or the inside verification is proper, the determination of step S106 is "NO." In this case, the process in FIG. 4 ends without executing the door lock control.

Figure 5:
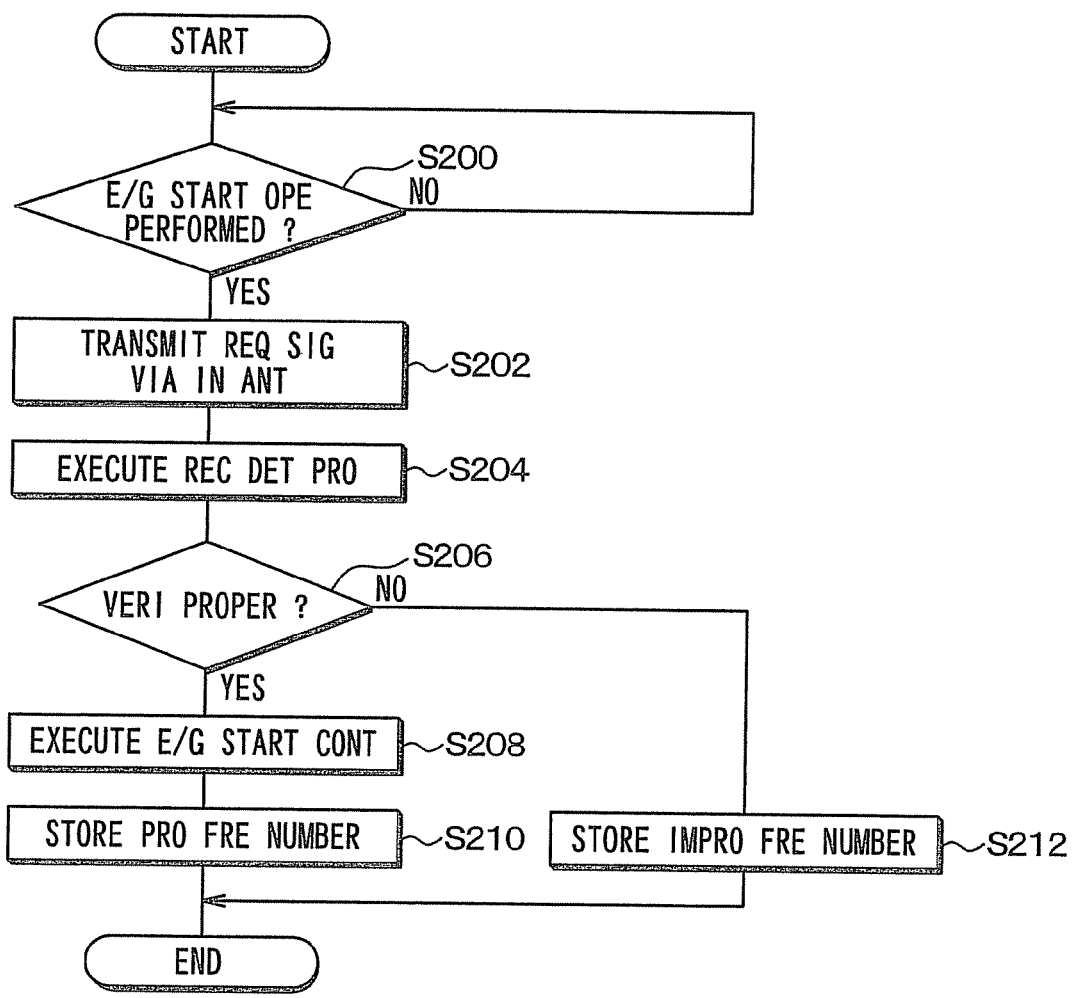
FIG. 5 is a diagram showing a flowchart of an engine starting process executed by the control unit on the vehicle when the user performs an engine starting operation of the vehicle.

FIG. 5 shows a flowchart of an engine starting process executed by the control unit 130 in the in-vehicle unit 100 when the user performs an engine starting operation of the vehicle. The control unit 130 periodically executes the process in FIG. 5.

First, in step S200, the control unit 130 determines whether the user performs the engine starting operation of the vehicle. Specifically, the control unit 130 determines whether the user pushes the engine start/stop switch under a condition that the vehicle stops. The determination that the vehicle stops is performed according to a signal from a vehicle speed sensor.

When the user does not push the engine start/stop switch under a condition that the vehicle stops, the determination of step S200 is "NO." Then, it returns to step S200. When the user pushes the engine start/stop switch under a condition that the vehicle stops, the determination of step S200 is "YES." Then, in step S202, the control unit 130 controls the inside antenna to transmit the request signal including the random information. Multiple bits such as three bits for the information showing the switching pattern of the frequencies of the response signal are assigned in the request signal. The switching pattern is randomly specified by associating a part of the request signal with multiple bits.

Next, in step S204, the control unit 130 executes the reception determination process of the response signal. Specifically, the control unit 130 receives the response signal by tuning the reception frequency with the switching pattern. Further, the control unit 130 performs the identification process for identifying the ID code in the reply signal of the response signal with the ID code stored in the memory 132 of the control unit 130. Thus, the control unit 130 executes the reception determination process of the response signal.

Next, in step S206, the control unit 130 determines according to the result of the reception determination process of the response signal whether the inside verification is proper.

The portable device 200, in which the ID code is preliminary registered, transmits the response signal according to the switching pattern of the frequencies, which is prepared in accordance with the information in the request signal. The tuner 102 receives the response signal according to the switching pattern of the frequencies, which is prepared in accordance with the information in the request signal. Further, when the ID code in the reply signal of the response signal coincides with the ID code stored in the memory 132 of the control unit 130, the control unit determines that the reception determination process is proper. In this case, the determination in step S206 is "YES." Then, in step S208, the control unit 130 executes the engine starting control. Specifically, the control unit 130 inputs the engine starting instruction signal to the engine controller 400. Thus, the engine of the vehicle starts.

Next, in step S210, the control unit 130 controls the memory 132 to store and accommodate the number of frequencies, which are determined as proper reception. Then, the process in FIG. 5 ends.

Further, when the tuner 120 does not receive the response signal properly according to the switching pattern, which is prepared in accordance with the information in the request signal, the determination of step S206 is "NO." Then, the control unit 130 controls the memory 132 to store and accumulate the number of frequencies, which are determined as improper reception. Then, the process in FIG. 5 ends.

Further, for example, even if a third person having a malicious purpose copies the request signal, and transmits the response signal from the portable device 200 in response to the copied request signal, the portable device 200 sequentially transmits the response signal according to the switching pattern of the frequencies, which is randomly specified by the portable device 200. Thus, it is impossible to copy the response signal. Thus, the tuner 120 cannot receive the response signal normally, and therefore, the determination of step S206 is "NO." Thus, the third person does not start the engine of the vehicle, and the process in FIG. 5 ends.

In the above construction, the portable device 200 can transmit the response signal with switching multiple frequencies. The in-vehicle unit 100 transmits the request signal including the random information. The in-vehicle unit 100 specifies the switching pattern of the frequencies of multiple response signals transmitted from the portable device 200 according to the part of the information in the request signal. The in-vehicle unit 100 executes the reception determination process of the response signal transmitted from the portable device 200 with using the switching pattern, which is prepared in accordance with the information in the request signal. Thus, it is difficult for the third person to specify the switching pattern of the frequencies of the response signal. Thus, the security is improved.

In the present embodiment, the switching pattern of the frequencies of the response signal is randomly specified in a case where the user performs the engine starting operation and in a case where the user performs the door locking operation, individually. The in-vehicle unit 100 transmits the request signal including the information that shows the switching pattern. The in-vehicle unit 100 executes the reception determination process of the response signal, which is transmitted from the portable device 200 in response to the request signal. Even when the user performs the engine stopping operation and even when the user performs the door unlocking operation, the switching pattern of the frequencies of the response signal may be randomly specified, and the in-vehicle unit 100 may transmit the request signal including the information that shows the switching pattern. Further, the in-vehicle unit 100 executes the reception determination process of the response signal, which is transmitted from the portable device 200 in response to the request signal.

Second Embodiment

Figure 6:
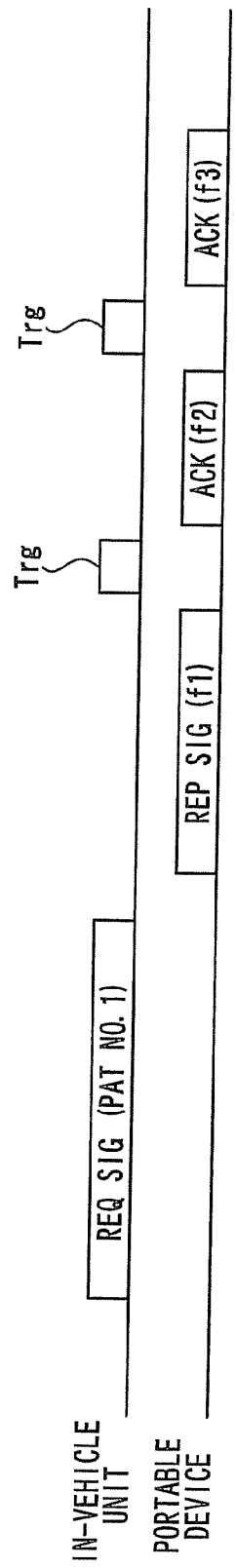
FIG. 6 is a diagram showing another response signal corresponding to a request signal.

In the first embodiment, the portable device 200 transmits sequentially the reply signal and the ACK signal in response to the request signal from the in-vehicle unit 100. In a second embodiment, the in-vehicle unit 100 transmits a trigger signal Trg to the portable device 200 after transmitting the request signal, as shown in FIG. 6. The portable device 200 transmits the reply signal as a first response signal in accordance with the reception of the request signal. Then, the portable device 200 transmits the ACK signal as a second response signal every time when the portable device 200 receives the trigger signal Trg.

In the above case, the in-vehicle unit 100 performs the reception determination process of the reply signal according to the reception of the request signal. Then, the in-vehicle unit 100 performs the reception determination process of the ACK signal every time when the portable device 200 receives the trigger signal Trg. Thus, the in-vehicle unit 100 executes the reception determination process of the response signal accurately.

Third Embodiment

In a third embodiment, when the number of proper times of the verification with respect to a certain frequency is small, the priority of the certain frequency is low. The frequency specification device specifies the switching pattern of the frequencies of the response signal transmitted from the portable device 200 to the exclusion of the low priority frequency.

The in-vehicle unit 100 transmits the information to the portable device 200, the information showing that the priority of the certain frequency is low when the number of proper times of the verification with respect to a certain frequency is small. The transmission time of the information is prior to the transmission and reception time of data for verification.

When the portable device 200 receives the information, the portable device 200 transmits the response signal with frequencies other than the low priority frequency, which provides the small number of proper times of the verification.

The control unit 130 of the in-vehicle unit 100 defines the frequency, of which the number of proper times of the verification is small, as the low priority frequency, and specifies the frequency pattern of the response signal from the portable device 200 to the exclusion of the low priority frequency in steps S104 and S114 in FIG. 4. Thus, since the switching pattern of the frequencies of the response signal is specified to the exclusion of the frequency, which is received abnormally or improperly because of an interfering wave or the like, the responsibility is restricted from reducing, and the influence of the interfering wave is restricted.

Fourth Embodiment

In the present embodiment, when the number of times that the verification is improper with respect to a certain frequency is large, the certain frequency is defined as a low priority frequency. The frequency specifying device specifies the switching pattern of the frequencies of the response signal transmitted from the portable device 200 to the exclusion of the low priority frequency.

The in-vehicle unit 100 transmits the information to the portable device 200, the information showing that the priority of the certain frequency is low when the number of times that the verification is improper with respect to the certain frequency is large. The transmission time of the information is prior to the transmission and reception time of data for verification.

When the portable device 200 receives the information, the portable device 200 transmits the response signal with frequencies other than the low priority frequency, which provides the large number of improper times of the verification.

The control unit 130 of the in-vehicle unit 100 defines the frequency, of which the number of improper times of the verification is large, as the low priority frequency, and specifies the frequency pattern of the response signal from the portable device 200 to the exclusion of the low priority frequency in steps S104 and S114 in FIG. 4. Thus, since the switching pattern of the frequencies of the response signal is specified to the exclusion of the frequency, which is received abnormally or improperly because of an interfering wave or the like, the responsibility is restricted from reducing, and the influence of the interfering wave is restricted.

Fifth Embodiment

In the first embodiment, the number of times that the response signal is transmitted from the portable device 200 in accordance with the unlocking operation is equal to the number of times that the response signal is transmitted from the portable device 200 in accordance with the engine starting operation, that is three times. In the present embodiment, in view of large damage in a case where the verification is illegally established, the number of times that the response signal is transmitted from the portable device 200 in accordance with the unlocking operation is changed. Specifically, the number of times that the response signal is transmitted from the portable device 200 is varied according to a type of operation.

In the present embodiment, for example, the in-vehicle unit 100 determines that the number of times that the response signal is transmitted from the portable device 200 in accordance with the unlocking operation and the locking operation is twice. The number of times that the response signal is transmitted from the portable device 200 in accordance with the engine starting operation is three times. Thus, the switching pattern of the frequencies of the response signal is specified.

In the above construction, the number of times that the response signal is transmitted from the portable device 200 in accordance with the engine starting operation is larger than the number of times that the response signal is transmitted from the portable device 200 in accordance with the unlocking operation and the locking operation. Accordingly, even if the third person succeeds to unlock the door of the vehicle illegally, it is difficult for the third person to start the engine illegally. Thus, the vehicle is protected from theft. Thus, the theft damage in a case where the verification is illegally established is reduced.

Sixth Embodiment

In the present embodiment, the switching pattern of the response signal is randomly specified, and the reception determination process of the response signal from the portable device 200 is executed, so that the verification is performed. During a predetermined time interval after the verification is established, the frequency of the response signal from the portable device 200 is fixed to one of the frequencies of the response signal transmitted from the portable device 200 at a time when the verification is established for the first time.

The in-vehicle unit 100 specifies the switching patter of the response signal randomly, and executes the reception determination process of the response signal transmitted from the portable device 200, so that the unit 100 executes the verification. When the verification is established, the in-vehicle unit 100 inputs an instruction signal to the portable device 200 so as to fix the frequency of the response signal with respect to following verifications of the portable device 200, the response signal which is to be transmitted from the portable device 200, to one of the frequencies, which is used in the verification of the portable device 200 at a time when the verification is established, during a predetermined time interval after the verification is established.

In accordance with the above instruction signal, the portable device 200 fixes the frequency of the response signal transmitted from the device 200 to the one of the frequencies, which is used in the verification of the portable device 200 at a time when the verification is established, during the predetermined time interval.

The control unit 130 of the in-vehicle unit 100 specifies the switching pattern of the response signal randomly, and executes the reception determination process of the response signal from the portable device 200, so that the unit 100 performs the verification. When the verification is established, the unit 100 receives the response signal at the fixed one of the frequencies of the response signal, which is transmitted from the portable device 200 at a time when the verification is established for the first time, during the predetermined time interval after the verification is established. Thus, the responsibility is much improved.

Seventh Embodiment

In the first embodiment, the in-vehicle device controller specifies the switching pattern of the frequency of the response signal randomly when the verification for the engine starting control is executed in accordance with the engine starting operation. The in-vehicle device controller executes the reception determination process of the response signal from the portable device 200 in response to the request signal including the information showing the switching pattern of the frequency of the response signal. When the verification for the engine stopping control is executed in accordance with the engine stopping operation, it is not necessary to protect the vehicle from the theft damage. Similarly, when the verification for the door locking control is executed in accordance with the door locking operation, it is not necessary to protect the vehicle from the theft damage.

In the present embodiment, the in-vehicle device controller monitors operations for instructing release of security functions of the vehicle and operations for instructing setting of security functions. Here, the operations for instructing release of security functions are, for example, a door unlock operation or a engine start operation. The operations for instructing setting of security functions are, for example, a door lock operation or a engine stop operation. Specifically, the in-vehicle device controller determines whether the safety operation with respect to the vehicle is performed.

When the in-vehicle device controller determines that the safety operation with respect to the vehicle is performed, the in-vehicle unit 100 instructs the portable device 200 to fix the frequency of the response signal to be predetermined one of the frequencies.

When the portable device 200 receives the instruction from the unit 100, the portable device 200 fixes the frequency of the response signal to be the predetermined one of the frequencies.

When the in-vehicle device controller determines that the safety operation with respect to the vehicle is performed, the control unit 130 of the in-vehicle unit 100 receives the response signal with fixing the frequency to be the predetermined one of the frequencies. Thus, the responsibility of the in-vehicle device controller is much improved.

Eighth Embodiment

The in-vehicle device controller according to the present embodiment includes a navigation device (not shown) and a navigation interface for communicating data. The in-vehicle device controller obtains the information for specifying the position of the vehicle from the navigation device via the navigation interface.

Figure 7:
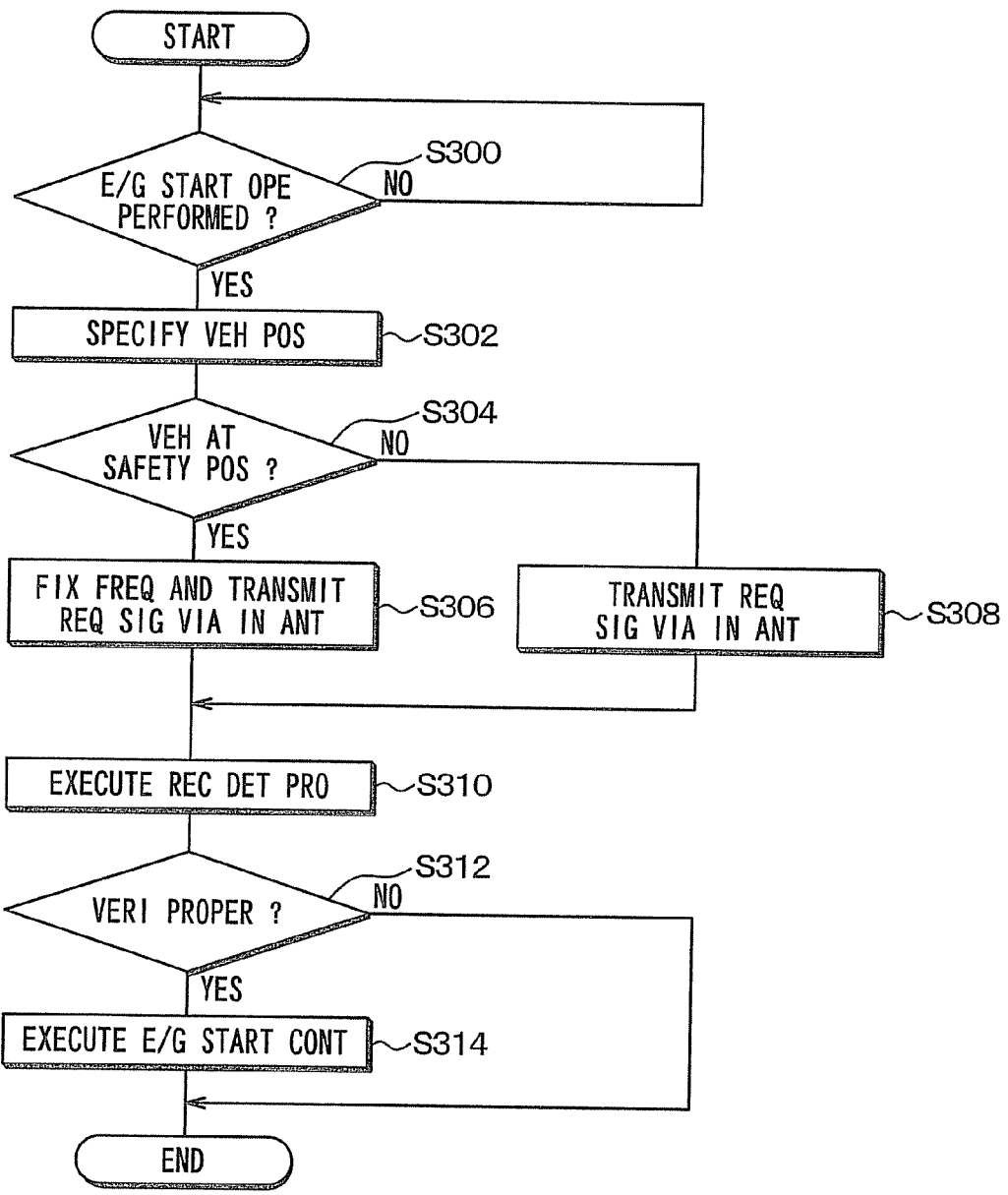
FIG. 7 is a diagram showing a flowchart of another engine starting process executed by the control unit on the vehicle when the user performs an engine starting operation of the vehicle.

FIG. 7 shows a flowchart of an engine starting process executed by the control unit 130 on the vehicle when the user performs an engine starting operation of the vehicle. The control unit 130 periodically executes the process in FIG. 7.

First, in step S300, the control unit 130 determines whether the user performs the engine starting operation of the vehicle. When the user does not perform the engine starting operation of the vehicle, the determination of step S300 is "NO." Then, it returns to step S300.

When the user performs the engine starting operation of the vehicle, the determination of step S300 is "YES." Then, in step S302, the control unit 130 obtains the information for specifying the position of the vehicle from the navigation device via the navigation interface. Thus, the control unit 130 specifies the position of the vehicle based on the information from the navigation device.

Then, in step S304, the control unit 130 determines whether the vehicle is disposed at a safety position. In the present embodiment, the safety position is defined as an area within a predetermined distance range from a parking lot at home, a position of which is preliminary registered, an area within a predetermined distance range from a building, a position of which is preliminary registered, and an area other than dangerous place. Thus, the unit 130 determines whether the current vehicle position is the safety position.

Here, for example, when the vehicle is disposed at a position in the area within the predetermined distance range from the parking lot at home, the determination of step S302 is "YES." Next, in step S306, the control unit 130 fixes the frequency to be a predetermined frequency of the response signal. Further, the control unit 130 transmits the request signal via the inside antenna.

When the vehicle is not disposed at a position in the area within the predetermined distance range from the parking lot at home, the area within the predetermined distance range from the building, and the area other than dangerous place, the determination of step S302 is "NO." Next, in step S308, the control unit 130 transmits the request signal including random information via the inside antenna.

The portable device 200 transmits the response signal in response to the request signal from the in-vehicle unit 100 transmitted at step S306 or S308.

Then, in step S310, the control unit 130 executes the reception determination process of the response signal. Specifically, the control unit 130 adjusts the reception frequency with the switching pattern of the frequencies of the response signal, which is specified in the request signal transmitted at step S306 or S308, so that the control unit 130 receives the response signal from the portable device 200 sequentially. Further, the control unit 130 performs the identification process for identifying the ID code in the reply signal of the response signal with the ID code stored in the memory 132 of the control unit 130. Thus, the control unit 130 executes the reception determination process of the response signal. Here, when the reception frequency is fixed to the predetermined frequency of the response signal in step S306, the control unit 130 receives the response signal at the fixed frequency.

Then, in step S312, the control unit 130 determines based on the reception determination result of the response signal whether the verification is established.

Here, when the control unit 130 determines based on the reception determination result of the response signal that the verification is established, i.e., proper, the determination of step S312 is "YES." Then, in step S314, the control unit 130 executes the engine starting control. Specifically, the control unit 130 controls the engine controller 400 to start the engine. Thus, the engine of the vehicle starts.

When the control unit 130 determines based on the reception determination result of the response signal that the verification is not established, i.e., improper, the determination of step S314 is "NO." Then, the control unit 130 ends the process in FIG. 7 without starting the engine of the vehicle.

As described above, the in-vehicle device controller determines whether the vehicle position is a safety position. When the in-vehicle device controller determines that the vehicle position is not a safety position, the in-vehicle device controller specifies the switching pattern of the frequency of the response signal from the portable device 200 randomly. When the in-vehicle device controller determines that the vehicle position is a safety position, the in-vehicle device controller fixes the reception frequency of the response signal to be predetermined one frequency.

Ninth Embodiment

In the sixth to eighth embodiments, the frequency of the response signal is fixed. In the present embodiment, the fixed frequency of the response signal is released when the in-vehicle device controller determines that the same operation, which is one of the door locking operation, the door unlocking operation, the engine starting operation and the engine stopping operation, and provides the verification of the portable device 200, is executed within a predetermined time interval.

The in-vehicle unit 100 inputs an instruction signal to the portable device 200 so as to release the fixation of the frequency of the response signal when the in-vehicle unit 100 determines that the same operation for instructing the verification of the portable device 200 is executed within the predetermined time interval.

When the portable device 200 receives the instruction signal from the in-vehicle unit 100, the portable device 200 releases the fixation of the frequency of the response signal.

When the control unit 130 determines that the same operation for instructing the verification of the portable device 200 is executed within the predetermined time interval, the control unit 130 fixes the reception frequency of the response signal to be predetermined one frequency, and receives the response signal. Thus, the responsibility of the in-vehicle device controller is improved.

In the present embodiment, when the control unit 130 determines that the same operation for instructing the verification of the portable device 200 is executed within the predetermined time interval, the portable device 200 releases the fixation of the frequency of the response signal. Alternatively, when the control unit 130 determines that the same operation for instructing the verification of the portable device 200 is sequentially executed within the predetermined time interval, the portable device 200 may release the fixation of the frequency of the response signal.

Tenth Embodiment

In the present embodiment, when the control unit 130 determines that multiple same operations for instructing the verification of the portable device 200 are executed, and the number of execution times of the same operations is equal to or larger than a predetermined times, the control unit 130 instructs the portable device 200 to release the fixation of the frequency of the response signal.

When the portable device 200 receives the instruction from the in-vehicle unit 100, the portable device 200 releases the fixation of the frequency of the response signal.

When the control unit 130 determines that multiple same operations for instructing the verification of the portable device 200 are executed, and the number of execution times of the same operations is equal to or larger than a predetermined times, the control unit 130 releases the fixation of the reception frequency of the response signal, and then, receives the response signal. Thus, the responsibility of the in-vehicle device controller is improved.

In the present embodiment, when multiple same operations for instructing the verification of the portable device 200 are executed, and the number of execution times of the same operations is equal to or larger than a predetermined times, the fixation of the frequency of the response signal is released. Alternatively, when multiple same operations for instructing the verification of the portable device 200 are sequentially executed, and the number of execution times of the same operations is equal to or larger than a predetermined times, the fixation of the frequency of the response signal may be released.

Eleventh Embodiment

In the present embodiment, when the control unit 130 determines that multiple same operations for instructing the verification of the portable device 200 are executed within the predetermined time interval, and the number of execution times of the same operations is equal to or larger than a predetermined times, the control unit 130 instructs the portable device 200 to release the fixation of the frequency of the response signal.

When the portable device 200 receives the instruction from the in-vehicle unit 100, the portable device 200 releases the fixation of the frequency of the response signal.

When the control unit 130 determines that multiple same operations for instructing the verification of the portable device 200 are executed within the predetermined time interval, and the number of execution times of the same operations is equal to or larger than a predetermined times, the control unit 130 releases the fixation of the reception frequency of the response signal, and then, receives the response signal. Thus, the responsibility of the in-vehicle device controller is improved.

In the present embodiment, when multiple same operations for instructing the verification of the portable device 200 are executed within the predetermined time interval, and the number of execution times of the same operations is equal to or larger than a predetermined times, the fixation of the frequency of the response signal is released. Alternatively, when multiple same operations for instructing the verification of the portable device 200 are sequentially executed within the predetermined time interval, and the number of execution times of the same operations is equal to or larger than a predetermined times, the fixation of the frequency of the response signal may be released.

Twelfth Embodiment

In the present embodiment, a selection screen for selection a specifying method of the switching pattern of multiple frequencies in the response signal is displayed. According to the selection screen, the user selects the specifying method of the switching pattern. Then, based on the selected specifying method, the switching pattern of multiple frequencies of the response signal is specified.

Thirteenth Embodiment

In the first embodiment, the switching pattern of the frequencies of the response signal is determined according to the predetermined specified bits such as three bits in the request signal. In the present embodiment, the frame of the request signal is divided into multiple blocks. The switching pattern of the response signal is determined by a frequency specified by data of each block.

For example, when the frame length of the request signal is 32 bits, the frame is divided into four blocks having 8 bits. The first block shows a first frequency, the second block shows a second frequency, the third block shows a third frequency, and the fourth block shows a fourth frequency. The switching pattern of the response signal is prepared by arranging the first to fourth frequencies in this order. For example, the first block represents a value of "3h," the second block represents a value of "2h," the third block represents a value of "Fh," and the fourth block represents a value of "Dh." Here, "h" represents the hexadecimal number. When the value of the block is "3," the frequency of the response signal is f1. When the value of the block is "2," the frequency of the response signal is f2. When the value of the block is "F," the frequency of the response signal is f3. When the value of the block is "D," the frequency of the response signal is f2. In this case, the switching pattern of the frequencies of the response signal is an arrangement of f1, f2, f3, and f2 in this order.

Thus, the frame of the request signal is divided into multiple blocks. The switching pattern of the frequencies of the response signal is determined based on the frequencies specified by the values of the blocks. Thus, it is not necessary to assign the bits for specifying the switching pattern in the request signal.

Fourteenth Embodiment

In the first embodiment, the switching pattern of the frequencies of the response signal is determined according to the predetermined specified bits such as three bits in the request signal. In the present embodiment, the data value in the frame of the request signal is defined as a valuable number, and the switching pattern is determined according to a function with the valuable number.

For example, when the frame length is 32 bits, the frame is divided into four blocks having 8 bits. The first block represents a value of "4h," the second block represents a value of "Ah," the third block represents a value of "6h," and the fourth block represents a value of "3h." The valuable number is the value of "4A63." With using the function f(x) having the valuable number of "4A63," the switching pattern is determined. For example, when the function fx(4A63) is equal to a value of "001," the switching pattern is determined as an arrangement of f1, f3 and f3 according to the value of "001."

Thus, the switching pattern is determined with using the function having the valuable number of data in the frame of the request signal. It is not necessary to assign the bits for specifying the switching pattern in the request signal.

Fifteenth Embodiment

In the first embodiment, the switching pattern of the frequencies of the response signal is determined according to the predetermined specified bits such as three bits in the request signal. In the present embodiment, the frame of the request signal is divided into multiple blocks, and the switching pattern of the response signal is determined by the frequencies, each of which is specified by data of a specific bit in a corresponding block.

For example, when the frame length is 32 bits, the frame is divided into four blocks having 8 bits. The data value of a low three bit in the first block represents a first frequency, the data value of a low two bit in the second block represents a second frequency, the data value of a low fifteen bit in the third block represents a third frequency, and the data value of a low thirteen bit in the fourth block represents a fourth frequency. The switching pattern is determined by the arrangement of the first to fourth frequencies in this order.

Thus, the frame of the request signal is divided into multiple blocks, and the switching pattern is determined by the arrangement of the frequencies, which are specified by the data values of the specific bits in the blocks. Thus, it is not necessary to assign the bit for specifying the switching pattern in the request signal.

Other Embodiments

In the above embodiments, the verification of the portable device 200 is performed in accordance with the door locking operation, the door unlocking operation, the engine starting operation and the engine stopping operation. Alternatively, the verification of the portable device 200 may be performed in accordance with other operations.

In the above embodiments, the engine as a driving power source is mounted on the vehicle, and the verification of the portable device 200 is performed in accordance with the engine starting operation and the engine stopping operation. Alternatively, for example, the vehicle may be a hybrid vehicle having the driving power source including the engine and a motor, and the verification of the portable device 200 may be performed in accordance with the engine and motor starting operation and the engine and motor stopping operation. Alternatively, the vehicle may be an electric vehicle having the driving power source of a motor, and the verification of the portable device 200 may be performed in accordance with the motor starting operation and the motor stopping operation.

Steps S102, S112, S202, S306 and S308 provide the request signal transmitting device. Steps S104, S114, S204, and S310 provide the frequency specifying device and the reception determination device. A step in FIG. 6 for transmitting the trigger signal Trg to the portable device 200 after transmitting the request signal provides the trigger signal transmitting device. Steps S108, S110, S210 and S212 provide the memory. The door switch arranged on the door handle and the touch sensor arranged on the backside of the door handle provide the first operation device. The engine start/stop switch provides the second operation device. Step S302 provides the vehicle position detector, i.e., the vehicle position specifying device. Step S304 provides the determination device, i.e., the estimation device.

The above disclosure has the following aspects.

According to an example aspect of the present disclosure, an in-vehicle device controller includes: an in-vehicle unit mounted on a vehicle for controlling an in-vehicle device; and a portable device. The in-vehicle unit includes a request signal transmitter for transmitting a request signal including random information to the portable device. The portable device transmits a response signal in response to the request signal in such a manner that the response signal is transmitted at a plurality of frequencies, which are switched according to a switching pattern corresponding to a part of the random information in the request signal. The in-vehicle unit further includes a frequency specifying device for specifying the switching pattern based on the part of the random information in the request signal. The in-vehicle unit further includes a reception determination device for executing a reception determination process of the response signal based on a specified switching pattern. The in-vehicle device identifies the portable device according to the reception determination process. The in-vehicle unit controls the in-vehicle device according to an identification of the portable device.

In the above controller, since the switching pattern is specified according to the part of the random information in the request signal, and the in-vehicle unit executes the reception determination process of the response signal from the portable device with using the specified switching pattern, it is difficult to find the switching pattern for a third person. Thus, the responsibility of the controller is not reduced, and the security if he controller is improved.

Alternatively, the in-vehicle unit may further include a trigger signal transmitter for transmitting a trigger signal to the portable device after transmitting the request signal. The portable device transmits a second response signal in response to the trigger signal. The reception determination device executes the reception determination process of the second response signal. In this case, after the reception determination process of the response signal is performed for the first time, the reception determination process of the response signal is executed for the second time every time when the trigger signal transmitter transmits the trigger signal. Thus, the accuracy of the identification is improved.

Alternatively, the frequency specifying device may determine that a priority of a certain frequency is low when the number of proper times of the identification with respect to the certain frequency is low or when the number of improper times of the identification with respect to the certain frequency is high, and the frequency specifying device specifies the switching pattern to the exclusion of a low priority frequency. In this case, influence of an interfering wave is reduced with restricting the reduction of the responsibility.

Alternatively, the request signal transmitter may transmit the request signal to the portable device in response to an operation of a first operation device, which instructs one of a door locking operation and a door unlocking operation of the vehicle. The request signal transmitter transmits the request signal to the portable device in response to an operation of a second operation device, which instructs a starting operation of a driving power source, and the number of frequencies of the response signal switched according to the switching pattern in a case where the portable device transmits the response signal in response to the request signal with regard to the operation of the first operation device is smaller than the operation of the second operation device. In this case, even if a third person illegally unlocks the door of the vehicle, it is difficult for the third person to start the engine of the vehicle illegally. Thus, vehicle theft is restricted.

Alternatively, the in-vehicle device may identify the portable device a plurality of times in response to one request signal corresponding to one operation, and the frequency specifying device fixes a frequency of the response signal, which is to be transmitted from the portable device in a case where the in-vehicle device identifies the portable device for the second time and more, at one of frequencies of the response signal in the switching pattern when the in-vehicle device identifies the portable device for the first time. In this case, the responsibility is improved, compared with a case where the response signal is transmitted from the portable device at multiple frequencies.

Alternatively, during a predetermined time interval, the frequency specifying device may fix a frequency of the response signal, which is to be transmitted from the portable device after the in-vehicle device identifies the portable device for the first time, at one of frequencies of the response signal in the switching pattern when the in-vehicle device identifies the portable device for the first time. In this case, the responsibility is improved, compared with a case where the response signal is transmitted from the portable device at multiple frequencies.

Alternatively, the in-vehicle device controller may further include: a first operation device for instructing the in-vehicle device to release a security function of the vehicle; a second operation device for instructing the in-vehicle device to set the security function of the vehicle; and a determination device for monitoring an operation of the first operation device and an operation of the second operation device and for determining whether the operation of the first or second operation device is a safety operation with respect to the vehicle. The frequency specifying device fixes a frequency of the response signal, which is to be transmitted from the portable device, at a predetermined frequency when the determination device determines that the operation of the first or second operation device is the safety operation with respect to the vehicle. In this case, the responsibility is improved, compared with a case where the response signal is transmitted from the portable device at multiple frequencies. Further, the first operation device may provide one of a door unlocking operation and an engine starting operation, and the second operation device may provide one of a door locking operation and an engine stopping operation. The safety operation with respect to the vehicle is one of the operation of the second operation device and an operation of another device other than the first operation device after the operation of the first operation device.

Alternatively, the in-vehicle device controller may further include: a vehicle position detector for detecting a position of the vehicle; and a safety place determination device for determining based on the position of the vehicle whether the vehicle is disposed at a safety place. The frequency specifying device fixes a frequency of the response signal, which is to be transmitted from the portable device, at a predetermined one frequency when the safety place determination device determines that the vehicle is disposed at the safety place. When the safety place determination device determines that the vehicle is disposed at the safety place, the frequency specifying device fixes the frequency of the response signal. Thus, the responsibility is improved, compared with a case where the response signal is transmitted from the portable device at multiple frequencies. Further, the safety place may be one of a parking lot of home, a position of which is preliminary registered, an area within a predetermined distance range from a building, a position of which is preliminary registered, and an area other than a dangerous place.

Alternatively, the frequency specifying device may release fixation of the frequency of the response signal when the frequency specifying device determines that the same operation as the one operation is executed within a predetermined time interval. Until the predetermined time interval has elapsed, the responsibility is improved. After the predetermined time interval is elapsed, the security is improved with restricting the reduction of the responsibility.

Alternatively, the frequency specifying device may release fixation of the frequency of the response signal when the frequency specifying device determines that the same operation as the one operation is sequentially executed within a predetermined time interval. In this case, until the predetermined time interval has elapsed, the responsibility is improved. After the predetermined time interval is elapsed, the security is improved with restricting the reduction of the responsibility.

Alternatively, the frequency specifying device may release fixation of the frequency of the response signal when the frequency specifying device determines that the same operations as the one operation is executed, and the number of times of the same operations is equal to or larger than a predetermined value. Until the same operations are executed the predetermined number of times, the responsibility is improved. After the same operations are executed the predetermined number of times, the security is improved with restricting the reduction of the responsibility.

Alternatively, the frequency specifying device may release fixation of the frequency of the response signal when the frequency specifying device determines that the same operations as the one operation is sequentially executed, and the number of times of the same operations is equal to or larger than a predetermined value. Until the same operations are executed the predetermined number of times, the responsibility is improved. After the same operations are executed the predetermined number of times, the security is improved with restricting the reduction of the responsibility.

Alternatively, the frequency specifying device may release fixation of the frequency of the response signal when the frequency specifying device determines that the same operations as the one operation is executed within a predetermined time interval, and the number of times of the same operations is equal to or larger than a predetermined value. Until the same operations are executed the predetermined number of times within the predetermined time interval, the responsibility is improved. After the predetermined time interval has elapsed, the security is improved with restricting the reduction of the responsibility.

Alternatively, the frequency specifying device may release fixation of the frequency of the response signal when the frequency specifying device determines that the same operations as the one operation is sequentially executed within a predetermined time interval, and the number of times of the same operations is equal to or larger than a predetermined value. Until the same operations are executed the predetermined number of times within the predetermined time interval, the responsibility is improved. After the predetermined time interval has elapsed, the security is improved with restricting the reduction of the responsibility.

Alternatively, the in-vehicle device controller may further include: a display for displaying a selection screen for selecting a specifying method of the switching pattern. The frequency specifying device specifies the switching pattern according to a selected specifying method.

Alternatively, the in-vehicle unit further may include a memory for storing an ID code. The response signal includes an ID code. In the reception determination process, the reception determination device receives the response signal from the portable device with adjusting a reception frequency according to the specified switching pattern, and the reception determination device determines whether the ID code in the memory coincides with the ID code in the response signal so that the in-vehicle device identifies the portable device, and the in-vehicle unit controls the in-vehicle device to perform a predetermined operation when the identification of the portable device is proper. Further, the in-vehicle device may be an door lock and unlock device for locking and unlocking a door of the vehicle or an engine start and stop device for starting and stopping an engine of the vehicle. The request signal transmitter transmits the request signal in response to an operation of a door switch or an operation of an engine start and stop switch, and the request signal transmitter transmits the request signal for instructing the door lock and unlock device to lock the door of the vehicle when an user performs a door lock operation of the door switch. The request signal transmitter transmits the request signal for instructing the door lock and unlock device to unlock the door of the vehicle when the user performs a door unlock operation of the door switch, and the request signal transmitter transmits the request signal for instructing the engine start and stop device to start the engine of the vehicle when the user performs an engine start operation of the engine start and stop switch. The request signal transmitter transmits the request signal for instructing the engine start and stop device to stop the engine of the vehicle when the user performs an engine stop operation of the engine start and stop switch.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle device controller comprising:
an in-vehicle unit mounted on a vehicle for controlling an in-vehicle device; and
a portable device,
wherein the in-vehicle unit includes a request signal transmitter for transmitting a request signal including random information to the portable device,
wherein the portable device transmits a first response signal in response to the request signal in such a manner that the first response signal is transmitted at a plurality of frequencies, which are switched according to a switching pattern corresponding to a part of the random information in the request signal,
wherein the in-vehicle unit further includes a frequency specifying device for specifying the switching pattern based on the part of the random information in the request signal,
wherein the in-vehicle unit further includes a reception determination device for executing a reception determination process of the first response signal based on a specified switching pattern,
wherein the in-vehicle unit identifies the portable device according to the reception determination process,
wherein the in-vehicle unit controls the in-vehicle device according to an identification of the portable device,
wherein the request signal transmitter transmits the request signal to the portable device in response to an operation of a first operation device, which instructs one of a door locking operation and a door unlocking operation of the vehicle,
wherein the request signal transmitter transmits the request signal to the portable device in response to an operation of a second operation device, which instructs a starting operation of a driving power source, and
wherein the number of frequencies of the first response signal switched according to the switching pattern in a case where the portable device transmits the first response signal in response to the request signal with regard to the operation of the first operation device is smaller than the operation of the second operation device.

2. The in-vehicle device controller according to claim 1,
wherein the in-vehicle unit further includes a trigger signal transmitter for transmitting a trigger signal to the portable device after transmitting the request signal,
wherein the portable device transmits a second response signal in response to the trigger signal, and wherein the reception determination device executes the reception determination process of the second response signal.

3. The in-vehicle device controller according to claim 1, wherein the frequency specifying device determines that a priority of a certain frequency is low when the number of proper times of the identification with respect to the certain frequency is low or when the number of improper times of the identification with respect to the certain frequency is high, and
wherein the frequency specifying device specifies the switching pattern based on the part of the random information in the request signal in which a low priority frequency is excluded.

4. An in-vehicle device controller comprising:
an in-vehicle unit mounted on a vehicle for controlling an in-vehicle device; and
a portable device,
wherein the in-vehicle unit includes a request signal transmitter for transmitting a request signal including random information to the portable device,
wherein the portable device transmits a response signal in response to the request signal in such a manner that the response signal is transmitted at a plurality of frequencies, which are switched according to a switching pattern corresponding to a part of the random information in the request signal,
wherein the in-vehicle unit further includes a frequency specifying device for specifying the switching pattern based on the part of the random information in the request signal,
wherein the in-vehicle unit further includes a reception determination device for executing a reception determination process of the response signal based on a specified switching pattern,
wherein the in-vehicle unit identifies the portable device according to the reception determination process,
wherein the in-vehicle unit controls the in-vehicle device according to an identification of the portable device,
wherein the in-vehicle unit identifies the portable device a plurality of times in response to one request signal corresponding to one operation, and
wherein the frequency specifying device fixes a frequency of the first response signal, which is to be transmitted from the portable device in a case where the in-vehicle unit identifies the portable device for the second time and more, at one of frequencies of the first response signal in the switching pattern when the in-vehicle unit identifies the portable device for the first time.

5. An in-vehicle device controller comprising:
an in-vehicle unit mounted on a vehicle for controlling an in-vehicle device; and
a portable device,
wherein the in-vehicle unit includes a request signal transmitter for transmitting a request signal including random information to the portable device,
wherein the portable device transmits a response signal in response to the request signal in such a manner that the response signal is transmitted at a plurality of frequencies, which are switched according to a switching pattern corresponding to a part of the random information in the request signal,
wherein the in-vehicle unit further includes a frequency specifying device for specifying the switching pattern based on the part of the random information in the request signal,
wherein the in-vehicle unit further includes a reception determination device for executing a reception determination process of the response signal based on a specified switching pattern,
wherein the in-vehicle unit identifies the portable device according to the reception determination process,
wherein the in-vehicle unit controls the in-vehicle device according to an identification of the portable device, and
wherein, during a predetermined time interval, the frequency specifying device fixes a frequency of the first response signal, which is to be transmitted from the portable device after the in-vehicle unit identifies the portable device for the first time, at one of frequencies of the first response signal in the switching pattern when the in-vehicle unit identifies the portable device for the first time.

6. An in-vehicle device controller comprising:
an in-vehicle unit mounted on a vehicle for controlling an in-vehicle device; and
a portable device,
wherein the in-vehicle unit includes a request signal transmitter for transmitting a request signal including random information to the portable device,
wherein the portable device transmits a response signal in response to the request signal in such a manner that the response signal is transmitted at a plurality of frequencies, which are switched according to a switching pattern corresponding to a part of the random information in the request signal,
wherein the in-vehicle unit further includes a frequency specifying device for specifying the switching pattern based on the part of the random information in the request signal,
wherein the in-vehicle unit further includes a reception determination device for executing a reception determination process of the response signal based on a specified switching pattern,
wherein the in-vehicle unit identifies the portable device according to the reception determination process,
wherein the in-vehicle unit controls the in-vehicle device according to an identification of the portable device,
wherein the in-vehicle device controller further comprises:
a vehicle position detector for detecting a position of the vehicle; and
a safety place determination device for determining based on the position of the vehicle whether the vehicle is disposed at a safety place,
wherein the frequency specifying device fixes a frequency of the response signal, which is to be transmitted from the portable device, at a predetermined frequency when the safety place determination device determines that the vehicle is disposed at the safety place.

7. The in-vehicle device controller according to claim 6, wherein the safety place is one of a parking lot of home, a position of which is preliminary registered, an area within a predetermined distance range from a building, a position of which is preliminary registered, and an area other than a dangerous place.

8. The in-vehicle device controller according to claim 4, wherein the frequency specifying device releases fixation of the frequency of the response signal when the frequency specifying device determines that the same operation as the one operation is executed within a predetermined time interval.

9. The in-vehicle device controller according to claim 4, wherein the frequency specifying device releases fixation of the frequency of the response signal when the frequency specifying device determines that the same operation as the one operation is sequentially executed within a predetermined time interval.

10. The in-vehicle device controller according to claim 4, wherein the frequency specifying device releases fixation of the frequency of the response signal when the frequency specifying device determines that the same operations as the one operation is executed, and the number of times of the same operations is equal to or larger than a predetermined value.

11. The in-vehicle device controller according to claim 4, wherein the frequency specifying device releases fixation of the frequency of the response signal when the frequency specifying device determines that the same operations as the one operation is sequentially executed, and the number of times of the same operations is equal to or larger than a predetermined value.

12. The in-vehicle device controller according to claim 4, wherein the frequency specifying device releases fixation of the frequency of the response signal when the frequency specifying device determines that the same operations as the one operation is executed within a predetermined time interval, and the number of times of the same operations is equal to or larger than a predetermined value.

13. The in-vehicle device controller according to claim 4, wherein the frequency specifying device releases fixation of the frequency of the response signal when the frequency specifying device determines that the same operations as the one operation is sequentially executed within a predetermined time interval, and the number of times of the same operations is equal to or larger than a predetermined value.

14. The in-vehicle device controller according to claim 1, further comprising:
a display for displaying a selection screen for selecting a specifying method of the switching pattern,
wherein the frequency specifying device specifies the switching pattern according to a selected specifying method.

15. The in-vehicle device controller according to claim 1, wherein the in-vehicle unit further includes a memory for storing an ID code,
wherein the first response signal includes an ID code
wherein, in the reception determination process, the reception determination device receives the first response signal from the portable device with adjusting a reception frequency according to the specified switching pattern, and the reception determination device determines whether the ID code in the memory coincides with the ID code in the first response signal so that the in-vehicle unit identifies the portable device, and
wherein the in-vehicle unit controls the in-vehicle device to perform a predetermined operation when the identification of the portable device is proper.

16. The in-vehicle device controller according to claim 15, wherein the in-vehicle device is an door lock and unlock device for locking and unlocking a door of the vehicle or an engine start and stop device for starting and stopping an engine of the vehicle,
wherein the request signal transmitter transmits the request signal in response to an operation of a door switch or an operation of an engine start and stop switch,
wherein the request signal transmitter transmits the request signal for instructing the door lock and unlock device to lock the door of the vehicle when a user performs a door lock operation of the door switch,
wherein the request signal transmitter transmits the request signal for instructing the door lock and unlock device to unlock the door of the vehicle when the user performs a door unlock operation of the door switch,
wherein the request signal transmitter transmits the request signal for instructing the engine start and stop device to start the engine of the vehicle when the user performs an engine start operation of the engine start and stop switch, and
wherein the request signal transmitter transmits the request signal for instructing the engine start and stop device to stop the engine of the vehicle when the user performs an engine stop operation of the engine start and stop switch.

* * * * *